Jan. 6, 1970 J. R. MANHARDT 3,488,192
GAMMA REDUCTION OF HIGH CONTRAST SILVER HALIDE MATERIAL
Filed Oct. 5, 1965
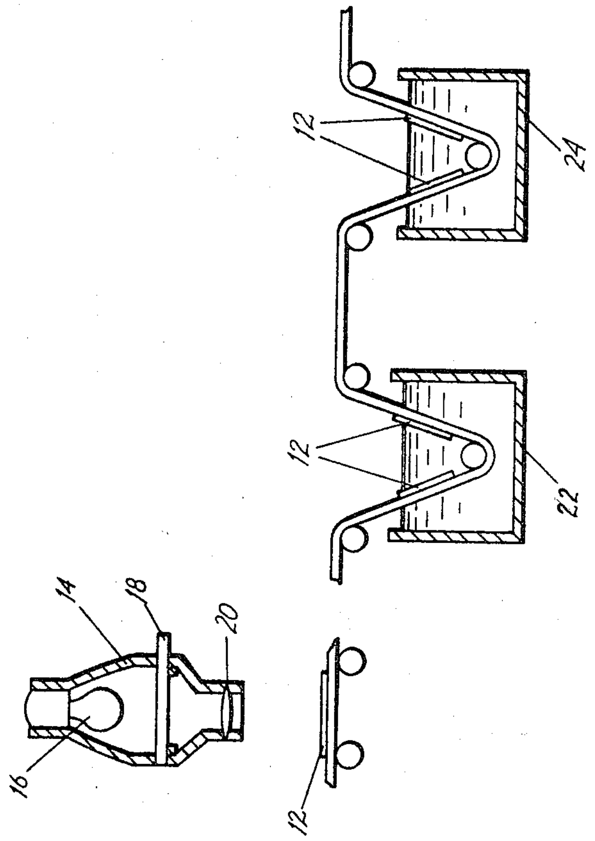
INVENTOR.
JOHN RICHARD MANHARDT
BY Stanley Belsky
John P. Morley
ATTORNEYS

United States Patent Office 3,488,192

Patented Jan. 6, 1970

3,488,192

GAMMA REDUCTION OF HIGH CONTRAST SILVER HALIDE MATERIAL

John Richard Manhardt, Nashua, N.H., assignor to Itek Corporation, Lexington, Mass., a corporation of Delaware Filed Oct. 5, 1965, Ser. No. 493,066

Int. Cl. G03c 5/30

U.S. Cl. 96—50 10 Claims

ABSTRACT OF THE DISCLOSURE

The process of reducing the contrast of a high-contrast silver halide data storage medium comprising exposing this medium, then contacting the thus-exposed medium to a solution of a metal compound of a metal more noble than silver and then contacting this medium with a suitable photographic developer.

This invention relates to data storage systems. More precisely, the invention disclosed herein relates to a data storage system which is especially advantageous in increasing the useful range of data storage media characterized by high contrast.

High contrast is a property of data storage media, such as silver halide media, which is well known to those skilled in the art. In general, this property is attributed to the particle size distribution of the photosensitive component of the media. For example, a media comprising silver halide having a very narrow particle size distribution will generally exhibit high contrast properties.

High contrast is a desirable property in media used in particular applications. For example, high contrast media are eminently suitable as storage media for data in a printed form, such as in the photolithographic art. However, as those well skilled in the art know, media characterized by high contrast do not always accurately or reliably reproduce tonal relationships which can exist in the data or information being stored therein. Accordingly, the use of high contrast media is oftentimes avoided when the data to be stored therein is in the form of a pictorial image. For example, the high contrast properties of such media would render same unsuitable or unqualified as storage media for such data or information as would be found in an aerial photograph. The tonal relationships existing in such information or data are essential to an accurate interpretation thereof, and hence high contrast media must be avoided or highly specialized techniques must be applied or elaborate precautions taken if such media are used.

A specific example of a data storage system in which the high contrast properties of media pose outstanding problems are those systems in which media are used to store data or information in a micro-dimensional size. Said systems usually employ high definition, high resolution media, since same are intrinsically best suited for such an application. Those well skilled in the art attribute the suitability of such media primarily to the particle size and the particle size distribution of the photosensitive component thereof. For example, the photosensitive silver halide of high definition, high resolution media is very small in particle size, and the particle size distribution is narrow. Such particle size characteristics assure that the details of data stored in such media will be reliably reproduced, even if said data is stored therein in a reduced size, for example, when the data stored therein has been reduced in size by a factor greater than about 10. However, as stated, those well skilled in the art also recognize that the above mentioned particle size characteristics detract from the overall suitability of high definition, high resolution media, especially when said media are employed to store therein data which comprises tonal relationships, for example, pictorial images.

In view of the above discussion, it would be most desirable to minimize—if not eliminate—the effect of high contrast properties of data storage media, to render said media more generally useful as data storage media, such as to extend the range of usefulness thereof to applications in which said media has been heretofore avoided.

A principal object of the present invention, is to provide an improved data storage system.

Another object of the present invention is to significantly decrease the gamma of high contrast data storage media so that tonal relationships in the data to be stored can be accurately and reliably reproduced in the storage media.

Another more specific object of the present invention, is to provide a data storage system in which data or information, including data in the form of printed or pictorial images, can be stored in high definition, high resolution media in a micro-dimensional size, despite the inherent attendant high contrast properties of such media.

Still other objects and advantages of the present invention will in part appear hereinafter or will in part be apparent to those well skilled in the art.

I have discovered that the reliability and overall accuracy of data stored in high contrast data storage media can be improved in a surprisingly unexpected fashion, by contacting said media with a solution of a compound comprising a metal more noble than silver, after exposure and prior to the development of said media. Accordingly, the above objects and advantages are realized in accordance with the practice of the present invention by a data storage sysem which involves a novel integration of steps as applied in a definite sequence and fashion to particular data storage media.

The data storage system of the present invention will be better understood by reference to FIGURE 1, which illustrates in schematic fashion, an arrangement of apparatus suitable to accomplish the essential steps involved.

Referring now to FIGURE 1, data or information is stored in reduced size in data storage medium 12, by exposure thereof to exposure means 14. Data storage medium 12 is a high contrast medium, such as a high definition, high resolution silver halide photographic medium, and can be in any suitable form, such as in the form of a film strip or a plate. As stated, said media are especially suitable for storing data therein in a micro-dimensional size. Exposure means 14 comprises a suitable source of activating radiation 16, transparency 18, comprising an information image pattern desired to be stored, and appropriate optical systems 20 for focusing the image in a desired reduced size on medium 12.

After exposure, medium 12 is conveyed to tank 22, which contains a solution of a compound comprising a metal more noble than silver. For the purposes of the present invention, metals more noble than silver are those that possess electrode potentials greater than that of silver at equivalent concentrations. Such metals include gold, platinum, mercury, ruthenium and palladium. Suitable compounds of said metals include the organic and inorganic compounds thereof, as well as the organometallic complexes thereof. Preferred compounds are the water soluble salts—especially the chlorides—of gold and platinum. Accordingly, representative preferred compounds include potassium bromoaurate, auric chloride, potassium chloroplatinate, platinic chloride, platinum sulfate, platinum pyrophosphate and others which could be mentioned. The concentration of the compound in the solution of tank 22 is not especially critical. For example, dilute, saturated, or supersaturated solutions can be suitably used. As an illustration, suitable concentrations of compounds can range from about 0.01 percent by weight of solution to about 60 percent by weight or somewhat higher. Also, the length of time during which medium 12 is contacted with the above-mentioned solutions is not especially critical, but excessively long contact times are preferably avoided. In most instances, about one minute is suitable. When solutions of low concentrations of a compound are involved, longer contact times are oftentimes desirable.

After contacting medium 12 with the above-mentioned solutions, the medium is preferably washed to remove any excess solution. Thereafter, medium 12 is developed in tank 24. The developers and developing procedure involved are well known in the silver halide photographic art. Accordingly, further discussion thereof is considered unnecessary. It is to be understood however, that additional processing steps can be applied to the medium, such as washing, fixing and the like.

The following examples illustrate embodiments of my invention and are presented so that those skilled in the art can better understand methods of practicing my invention as well as appreciate the advantages to be derived from the practice thereof. Accordingly, it is to be understood that the examples are illustrative in nature and in no way are they to be construed so as to limit my invention beyond those limitations which are expressly set forth in the present specification or in the claims which appear hereinafter.

EXAMPLE 1

Spectroscopic film, type 649 GH is a high definition, high resolution, and high contrast film produced by Eastman Kodak Company. Said film is primarily used in the art as a data storage medium, especially for storing data in a micro-dimensional size. Said film was exposed to a tungsten light source through a sensitometric step tablet having density increments of 0.15. After exposure the film was developed in Kodak developer D–19 for about 6 minutes at 68° F. The formulation of Kodak developer D–19 is described in detail on page 38 of "Processing Chemicals and Formulas for Black and White Photography" fifth edition, first 1956 printing, Kodak publication No. J–1. The photographic properties of the developed film were determined in accordance with a standard sensitometry technique as described in detail on page 14 of a publication entitled, "Fundamentals of Photographic Theory," second edition, by T. H. Fames and George C. Higgins, published in 1960 by Morgan and Morgan, Inc. New York, N.Y. The following data were obtained:

Table 1.—Photographic properties

| | |
|---|---|
| Gamma (contrast) | 5.6 |
| Base and fog density | 0.05 |

EXAMPLES 2 THROUGH 12

Substantially the same exposure and development procedure as set forth in Example 1 was followed in Examples 2 to 12 listed in tabular form below. However, in each of the following examples, the exposed films were immersed or otherwise contacted with an aqueous solution of a compound comprising a metal more noble than silver, prior to development of the exposed films. The following data were obtained:

TABLE 2.—PHOTOGRAPHIC PROPERTIES

| Example No. | Noble Metal Solution | Concentration of metal salt solution, gm./liter | Immersion time, minutes | Gamma (contrast) | Base and fog density |
|---|---|---|---|---|---|
| 2 | Potassium chloroplatinate | 6.0 | 2 | 1.7 | 0.05 |
| 3 | do | 3.0 | 2 | 1.9 | 0.05 |
| 4 | do | 1.5 | 2 | 2.2 | 0.05 |
| 5 | do | 1.0 | 2 | 2.8 | 0.05 |
| 6 | Potassium bromoaurate | 3.0 | 2 | 1.5 | 0.04 |
| 7 | do | 3.0 | 5 | 1.8 | 0.03 |
| 8 | do | 3.0 | 10 | 3.5 | 0.03 |
| 9 | do | 1.5 | 0.5 | 1.4 | 0.02 |
| 10 | do | 1.5 | 1 | 1.7 | 0.04 |
| 11 | do | 1.5 | 2 | 1.7 | 0.03 |
| 12 | do | 1.5 | 4 | 1.7 | 0.02 |

Examples 2 through 12 clearly demonstrate that the contrast properties of high contrast media can be dramatically altered in accordance with the practice of my invention. Also, the above examples indicate that such factors as time of immersion and concentration of the noble metal containing compound have some effect on the ultimate contrast value obtained. Accordingly, the contrast value can be selectively adjusted by a predetermined degree, by taking such factors into consideration. Also, although Examples 2–12 illustrate a dramatic reduction in the contrast value of a medium having a high initial contrast value, it is to be understood that the practice of my invention can be employed to significantly alter the contrast value of other data storage media. Accordingly, for the purpose of the present invention, high contrast media include those which when exposed to actinic light and developed in accordance with a conventional technique consistent with the application for which the media is intended will have a contrast or gamma value greater than about 2.

EXAMPLE 13

Special high definition aerial duplicating film, type SO–105 is a high definition, high resolution, and high contrast film produced by Eastman Kodak. Said film was exposed and developed in the fashion set forth in Example 1. The photographic properties of the developed film were determined in accordance with the standard sensitometry technique described in Example 1. The following data were obtained:

Table 3.—Photographic properties

| | |
|---|---|
| Gamma (contrast) | 10 |
| Base and fog density | 0.04 |

EXAMPLES 14 THROUGH 16

Substantially the same exposure and development procedure as set forth in Example 1 was followed in Examples 14–16 which appear in tabular form below. However, in each of the following examples, the exposed films were immersed in solution of platinic chloride prior to development. The following data were obtained:

TABLE 4.—PHOTOGRAPHIC PROPERTIES

| | Concentration of platinic chloride in solution, gm./liter | Immersion time, minutes | Gamma (contrast) | Base and fog density |
|---|---|---|---|---|
| Example No.: | | | | |
| 14 | 0.3 | 1 | 0.73 | 0.04 |
| 15 | 0.3 | 2 | 0.18 | 0.04 |
| 16 | 0.2 | 2 | 3.8 | 0.04 |

The above example illustrates the effectiveness of the preferred compounds in the practice of the present invention. These preferred compounds are the chlorides of the metals more noble than silver and especially the chlorides of gold and platinum. However, adjusted contrast properties can be realized if compounds comprising any of the metals more noble than silver are used, or if mixtures thereof are involved.

Many modifications in the details of the above examples, offered for the purposes of illustrating my invention, may be introduced thereto without departing from the spirit and scope of the invention defined in the appended claims.

Having described my invention together with preferred embodiments thereof, as well as manners of practicing same, what I declare as new and desire to secure by U.S. Letters Patents is as follows:

1. In a data storage process wherein a high contrast silver halide data storage medium, which when exposed to actinic light and developed in accordance with a conventional technique consistent with the application for which the media is intended will have a gamma value greater than about 2, is exposed to a source of activating radiation modified by a pattern conforming to the data to be stored in said medium and said medium is subsequently developed to retrieve said data stored in said medium, the improvement which comprises:

contacting said medium with a solution consisting essentially of a compound of a metal selected from the group consisting of gold, platium, mercury, ruthenium, and palladium, subsequent to said exposure and prior to said development of said medium whereby said gamma is significantly decreased.

2. The process of claim 1 wherein said metal comprises gold.

3. The process of claim 1 wherein said metal comprises platinum.

4. The process of claim 1 wherein said metal comprises mercury.

5. The process of claim 1 wherein said metal comprises ruthenium.

6. The process of claim 1 wherein said metal compound comprises at least one member of the group consisting of potassium bromoaurate, auric chloride, potassium chloroplatinate, platinic chloride, platinum sulfate, and platinum pyrophosphate.

7. The process of claim 1 wherein said metal compound is a salt of gold.

8. The process of claim 1 wherein said metal compound is a salt of platinum.

9. The process of claim 1 wherein said metal compound is a gold halide.

10. The process of claim 1 wherein said metal compound is a platinum halide.

References Cited

UNITED STATES PATENTS 2,575,002 11/1951 Carroll ---------------- 96—65

NORMAN G. TORCHIN, Primary Examiner

MARY F. KELLEY, Assistant Examiner

U.S. Cl. X.R.

96—63